R. L. SMITH.
LOCKING DEVICE FOR MOTOR VEHICLES.
APPLICATION FILED APR. 17, 1918.
1,292,114.
Patented Jan. 21, 1919.
2 SHEETS—SHEET 1.
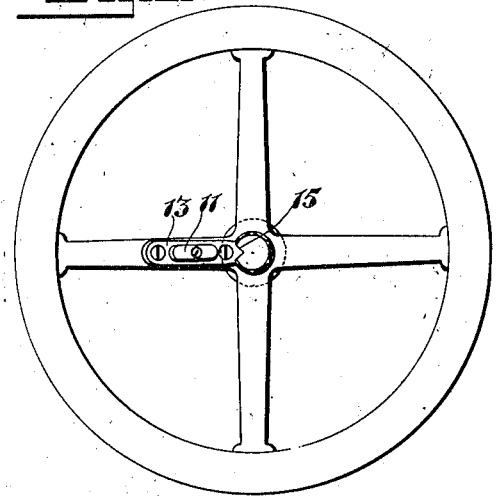
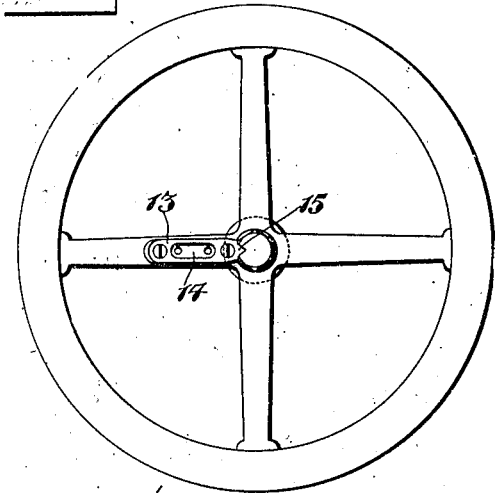
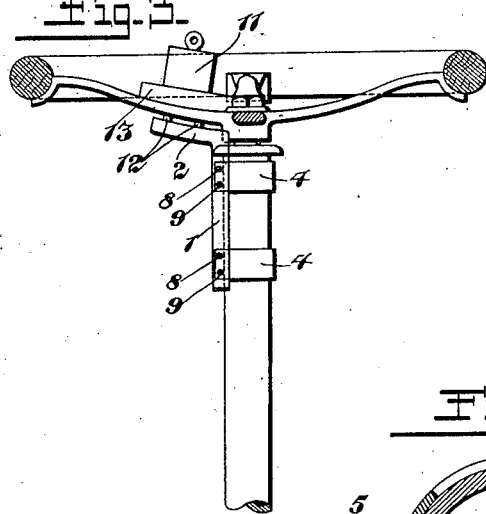
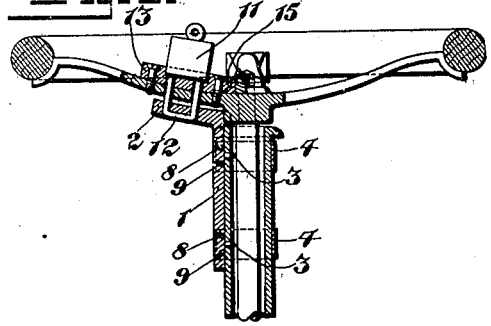
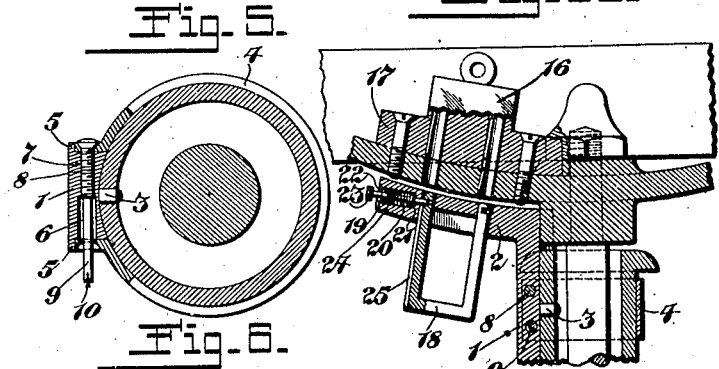
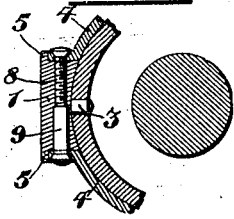
WITNESS.
Charles A. Becker.
INVENTOR.
Raphael L. Smith,
BY Rippey Kingsland,
HIS ATTORNEYS.

R. L. SMITH.
LOCKING DEVICE FOR MOTOR VEHICLES.
APPLICATION FILED APR. 17, 1918.
1,292,114.
Patented Jan. 21, 1919.
2 SHEETS—SHEET 2.
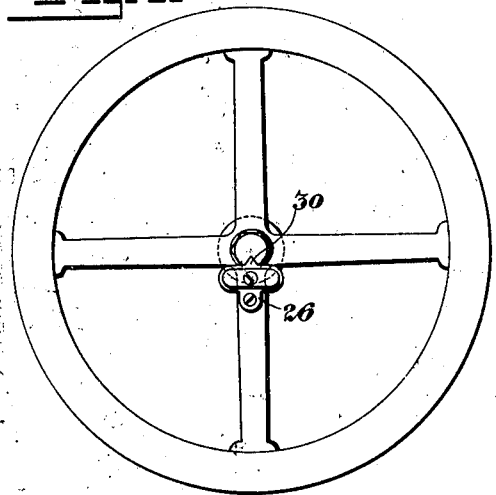
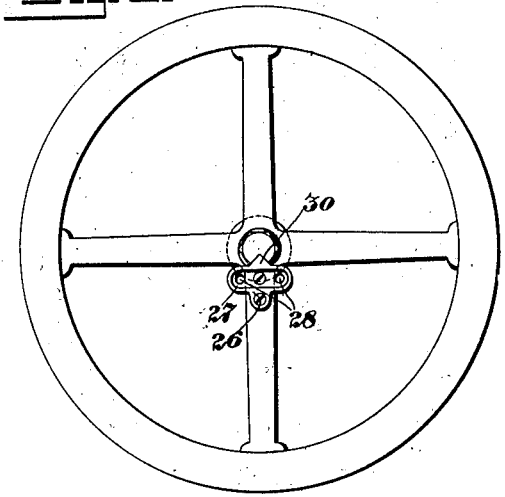
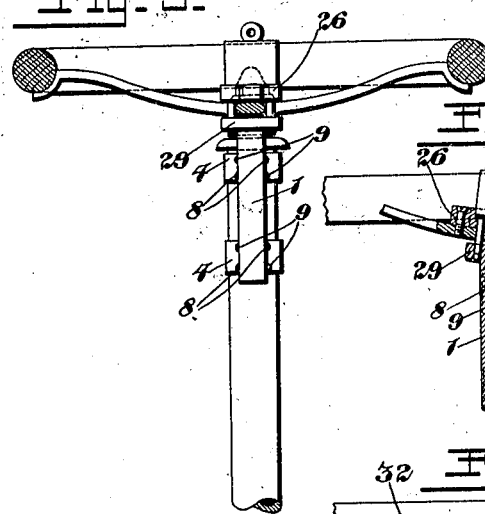
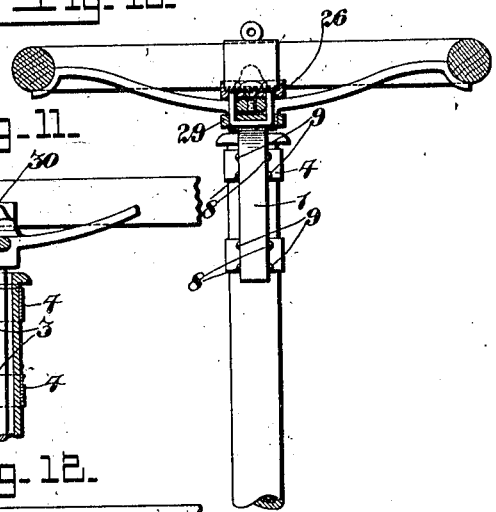
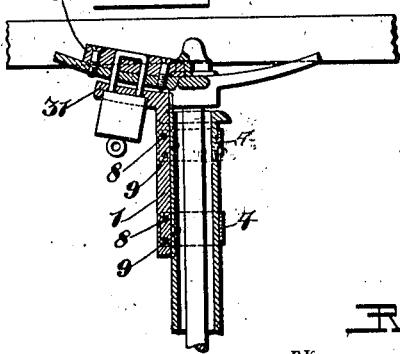
WITNESS.
Charles A. Becker.
INVENTOR.
Raphael L. Smith,
BY
Rippey & Kingsland.
HIS ATTORNEYS.

UNITED STATES PATENT OFFICE.

RAPHAEL L. SMITH, OF ST. LOUIS, MISSOURI.

LOCKING DEVICE FOR MOTOR-VEHICLES.

1,292,114.  Specification of Letters Patent.  Patented Jan. 21, 1919.

Application filed April 17, 1918. Serial No. 229,028.

*To all whom it may concern:*

Be it known that I, RAPHAEL L. SMITH, a citizen of the United States, residing at the city of St. Louis and State of Missouri, have invented a new and useful Locking Device for Motor-Vehicles, of which the following is a specification.

This invention relates to locking devices for motor vehicles.

An object of the invention is to provide a locking device adapted to be secured or applied to the steering column of an automobile and having a part for effecting a locking connection with a part of the steering mechanism to prevent turning or steering of the front wheels from the selected adjustment in which they are placed when the locking device is locked.

Another object of the invention is to provide an improved locking device for the steering mechanism of automobiles, comprising a case-hardened metallic arm in rigid connection with the steering column and a lock having a shackle adapted to engage one of the spokes of the steering wheel, the device including means for guarding and protecting the shackle from being cut or broken while in locking position, and means in connection with the device for preventing removal of the steering wheel from its connection with the steering mechanism.

Another object of the invention is to provide a novel connection for connecting the metallic arm with the steering column.

Another object is to provide a locking mechanism including a lock shackle and means for supporting and latching the same in position in which it can not be moved into the way of the operation of the locking wheel during the time that the shackle is supported in idle position in connection with the lock arm.

Other objects will appear from the following description, reference being made to the accompanying drawings, in which I have illustrated the invention and in which—

Figure 1 is a plan view of a steering wheel having the lock in connection therewith.

Fig. 2 is a similar view in which the detachable lock is removed from the wheel.

Fig. 3 is a sectional view of the wheel illustrating the locking device in elevation.

Fig. 4 is a view illustrating the lock arm and other parts engaged by the lock shackle in section, with the exception of the lock itself.

Fig. 4ᵃ is an enlarged sectional view illustrating the lock case in connection with the guard member which is secured to one of the spokes of the steering wheel.

Fig. 5 is an enlarged sectional view illustrating the novel securing device by which the lock arm is secured in connection with the steering column before the connection is completed.

Fig. 6 is a similar view illustrating the construction after the connection has been completed.

Fig. 7 is a plan view of a steering wheel having a locking device of a modified construction in connection therewith.

Fig. 8 is a similar plan view having the lock illustrated in Fig. 7 removed.

Figs. 9, 10 and 11 are sectional views illustrating other details and features of the modified construction.

Fig. 12 is a view illustrating the lock supported below the lock arm instead of above the steering wheel, as in Figs. 7 to 11.

My improved locking device may be readily applied to any automobile, appropriate and contemplated variations being made in the details of construction in order to adapt it for connection with any steering mechanism with which it may be desired to apply it. For convenience, I have chosen to illustrate the device in connection with the steering column and steering wheel of well known and conventional construction, so that the lock arm extends approximately at right angles from the steering column and parallel with the plane in which the spokes of the steering wheel operate.

As shown in Figs. 3 and 4 the lock arm comprises a part 1 bearing against and secured to the steering column, and a part 2 extending laterally from the part 1 below the plane in which the spokes of the steering wheel operate. This angular lock arm may be secured to the steering column by different methods. The method illustrated includes lugs or projections 3 rigid with the part 1 of the lock arm engaging within holes or recesses in the steering column to hold the lock arm from vertical or turning movement relative to the steering column. The part 1 being rigidly clamped in connection with the steering column it follows that the lugs or projections 3 in coöperation with the clamps will prevent movement or displacement of the lock arm in any direction, so that when the steering wheel is locked in connection therewith it is entirely impossible to turn the steering wheel in either direction.

While any appropriate form of retaining clamp may be employed, I prefer to use one which possesses the characteristics of rigidity and strength and such a degree of hardness that the clamping members can not possibly be cut or broken, or otherwise detached except by long and painstaking physical work and effort.

The clamps shown comprise two open rings 4 encircling the steering column and connected with the part 1 of the lock arm. The clamps hold the part 1 of the lock arm pressed closely against the steering column with the lugs or projections 3 engaging in the holes in the steering column to prevent movement of the lock arm. The devices by which the clamps are connected to the lock arm are of novel construction. By reference to Fig. 3 it will be observed that each clamp is connected to the lock arm by a plurality of fasteners, one of which is illustrated in Fig. 5 before the connection is completed, and in Fig. 6 after the connection is completed. As shown in Fig. 5, the ends of the clamp rings are seated in notches or recesses formed in the side edges of the clamp arm. The notches or recesses in which the ends of the clamps seat do not extend entirely across the side edges of the lock arm; but they extend only part of the way across the side edges, leaving shoulders 5 constituting walls at the ends of the notches against which the ends of the clamps bear or abut, so that it is entirely impossible to drive or force any tool or implement between the ends of the clamps and the lock arms with which the clamps are engaged in an effort to pry loose or break the connection. For each clamp the lock arm is provided with a number of holes, the preferred formation of which will be understood by reference to Fig. 5 in which it will be observed that each hole includes an enlarged portion 6 extending about one-half of the way, more or less, through the lock arm; and a companion portion 7 smaller than the portion 6 extending the remaining distance through the lock arm and being threaded. There are a plurality of such holes for each clamp, the number illustrated being two for each clamp, though it is apparent that the number may be varied as desired. One of the holes for each clamp is formed with the threaded portion extending inwardly from one edge of the lock arm, and another hole for the clamp is formed with the threaded portion at the opposite edge of the clamp so that the fastening members for each clamp are screwed into secure position from opposite edges of the clamp. The clamp members and the lock arm are preferably of case-hardened metal, or other material possessing the desired degree of hardness, as mentioned in the statement of the nature and object of the invention.

Each of the devices for binding the clamps in connection with the lock arm includes in its initial form a combined screw and rivet comprising a case-hardened threaded portion 8 which screws into the threaded portion 7 of one of the holes and provided with a head seating in a countersunk seat in the clamp; and an extended portion 9 of malleable material of sufficient length to extend entirely through and beyond the lock arm and the clamp. The extended portion 9 is originally formed so that it may be engaged with an operating tool, and, as shown, is formed with a groove 10 adapted to be engaged by a screw driver whereby the binding element may be screwed into the position shown in Fig. 5. After being screwed into the position shown in Fig. 5 the malleable extension 9 is hammered to the conformation illustrated in Fig. 6, in which the malleable part 9 completely fills the enlarged portion 6 of the hole in which the fastener is secured. After being thus completed the fastener is devoid of any grooves or other parts with which any tool or implement can be engaged. Since the fasteners for each clamp have their case-hardened threaded portions 7 at opposite sides of the lock arm it is quite clear that they cannot be drilled out or removed in any other manner without long and tedious work, so that it is nearly impossible to break or detach the connection between the clamps and the lock arm. Even though the malleable portions of the fasteners be drilled out or removed, nevertheless, there still remains a fastener for each side of each clamp, since, as stated, the clamp is provided with a plurality of fasteners the threaded portions of which are on alternately opposite sides of the lock arm.

One of the spokes of the steering wheel is provided with means for engaging the shackle of a lock whereby the wheel may be locked with the part 2 of the lock arm. In the form shown in Fig. 4 there is a lock 11 having a shackle 12 adapted to pass through two holes in one of the spokes of the steering wheel and through two holes in the part 2 of the lock arm. When the spoke having the holes therein is immediately above the part 2 of the lock arm the holes in the spoke and the lock arm are in alinement or registration so that the shackle of the lock may be passed therethrough and engaged with the lock 11 thus rigidly locking the steering wheel to the lock arm. The lock 11 may be of any preferred type, whether of the well known lock released by manipulation of a key or by permutation devices, or otherwise. In any instance, the lock case and shackle should be of very hard and strong material, such as case-hardened steel or other material possessing the degree of strength and hardness so that they cannot be severed or broken by the blow of a hammer or the like.

In the embodiment illustrated in Figs. 1 to 4 inclusive the lock 11 is above the steering wheel and there is preferably secured to the upper side of the spoke a guard plate 13 which is provided with a recess 14 of sufficient depth to receive the end of the lock so that no tool or the like can be driven between the lock and the plate, thus protecting the end of the lock by the case-hardened plate 13. The plate 13 is of hard material and may be nickel plated, or otherwise given a finished and ornamental appearance so that the wheel will not appear to be defaced by provision of the locking device.

The plate 13 is preferably connected or engaged with the nut holding the steering wheel on the steering rod. As shown the guard plate 13 has a projection 15 seating snugly within a corresponding recess in the nut by which the steering wheel is held upon the steering column. The recess or notch in the nut may be formed in an ornamental manner so that the ornamental surface of the nut is in no way modified or altered. An extension of the case-hardened guard 13 into the locking recess in the nut prevents the cutting or severance of the spoke between the lock and the hub of the wheel; and the interlocking engagement is also effective to prevent removal or detachment of the nut and the consequent loosening of the steering wheel.

As will be clearly understood by reference to Figs. 3 and 4 the shackle 12 seats within a receiving groove in the part 2 of the lock arm so that the shackle cannot be cut or broken by the use of any tool driven between the shackle and the lock arm.

In the alternative construction illustrated in Fig. 4ª, the lock case 16 is integral with the guard plate 17 secured to the spoke of the wheel and having locking engagement with the nut by which the steering wheel is secured to the steering rod. In this construction the shackle 18 when released from the lock is supported by the lock arm, a latch device being provided for that purpose. As shown a latch rod 19 is supported in the lock arm and is encircled by an expansion spring 20 mounted within a chamber in the lock arm and having its inner end abutting against a collar 21 on the latch rod and its outer end abutting against the closure 22 which closes the opening into the chamber in which the spring is mounted. Thus the latch rod is actuated inwardly. The latch rod may be drawn outwardly by a manually engageable part 23 to release the rod from latching engagement with the shackle, outward movement of the latch rod being limited by a stop 24 secured to the latch rod. In this form of the device the shackle is formed with a groove 25 in which the end of the latch operates and with a notch near its upper end in which the latch rod becomes seated when the shackle is in its lower and unlocking position illustrated in Fig. 4ª. The upper end of the groove 25 terminates at and opens into the notch so that there is a shoulder above the notch which will engage with the latch rod and prevent the shackle from being withdrawn from its connection with the lock arm. When it is desired to raise the shackle and to engage the same with the lock the latch rod may be drawn out of the notch in which it is seated by engaging the part 23 and drawing the rod outwardly in opposition to the spring 20, outward movement of the latch rod being limited by a stop 24 when the inner end of the latch rod is out of the notch. The stop 24 prevents the latch rod from being drawn outwardly beyond the shoulder above the notch in the shackle so that it is impossible to detach the shackle from the lock arm. Thus the lock is at all times in connection with the wheel and the shackle is at all times in connection with the lock arm, and the wheel may be quickly locked, the parts being in position for rapid engagement of the shackle with the lock at all times.

In that alternative embodiment illustrated in Figs. 7 to 11 inclusive a lock guard 26 is secured to one of the spokes of the steering wheel transversely thereof, having a lock receiving recess 27 in its upper side and the shackle holes 28 on opposite sides of the spoke so that when the shackle is in engagement with the lock, the spoke of the wheel is between the arms of the shackle as will be understood by reference to Figs. 9 and 10. In this construction the lock arm 29 is comparatively short and is provided with two holes for receiving the arms of the shackle and with a groove in its under side in which the shackle becomes seated when the shackle is in engagement. The lock guard 26 has locking engagement 30 with the nut holding the steering wheel on the steering rod as in the construction previously described.

In the embodiments illustrated in Figs. 1 to 11 the lock is above the steering wheel so that the key-opening in the lock may be observed and the key conveniently applied for unlocking the lock. In some instances it may be desired, however, to have the lock below the steering wheel. Such a construction is illustrated in Fig. 12 in which the lock arm 31 is provided with a recess for receiving and guarding the end of the lock case and the guard 32, which is secured to the spoke of the wheel, is provided with a groove in which the shackle becomes seated.

In the construction shown in Fig. 12 the shackle arms pass downwardly through holes in the guard and spoke, and through the lock arm into engagement with the lock which, as shown, is below the lock arm. When the lock shown in Fig. 12 is unlocked the shackle is removed so that it will not interfere with the turning of the steering wheel.

From the foregoing description it will be observed that it is necessary to equip only one of the spokes of the steering wheel with means for effecting locking engagement with the lock arm. Any one of the spokes may be so equipped whether it be one in which the front wheels are set for movement straight ahead, or are turned obliquely toward the side of the street or roadway. Thus the mechanism may be applied to the steering wheel in conformity with individual preference, or with the requirements of law or other conditions.

Modification of the parts so that they may be made to coöperate with any steering wheels used upon automobiles is, of course, contemplated, and also alteration in any other respects necessary to adapt the device for use in any embodiment in which it may be demanded.

What I claim and desire to secure by Letters Patent, is:—

1. In an automobile, the combination with steering mechanism comprising a column, a steering wheel mounted at the top of the column and provided with a spoke, and a nut holding the steering wheel in position, of a lock arm supported by the column and extending laterally therefrom below the steering wheel, projections extending from the lock arm into the column and holding the lock arm from turning and sliding movements, a member attached to said spoke of the steering wheel and locking the nut against relative rotation and detachment, and a lock device for engaging said arm and said member to prevent detachment of said member and to lock the steering wheel in connection with said arm.

2. In an automobile, the combination with steering mechanism comprising a column, a steering wheel at the top of the column having radial spokes, and a device securing the steering wheel in position, of a lock arm extending laterally from the column, means for holding the lock arm rigidly in connection with the column, a member locking said device in position to prevent removal of the steering wheel, and a lock in connection with said member arranged to lock the steering wheel in connection with said arm.

3. In an automobile, the combination with steering mechanism comprising a column, a steering wheel at the top of the column provided with spokes, a device for holding the steering wheel in position, and a member carried by a spoke of the steering wheel for preventing removal of said device, of a lock arm extending laterally from the column below the steering wheel, and a lock having a shackle adapted to engage said lock arm and said member and the spoke to which the said member is secured to lock said member in connection with the spoke and the steering wheel in connection with said arm.

4. In an automobile, the combination with steering mechanism comprising a column, a steering wheel at the top of the column provided with spokes, and a device holding the steering wheel in position, of a member secured to one of the spokes of the wheel for locking said device against detachment and thereby preventing removal of the steering wheel, and a lock for preventing turning of the steering wheel and locking said member in connection with the spoke to which it is secured.

5. In an automobile, the combination with steering mechanism comprising a column and a steering wheel at the top of the column having a spoke provided with holes therethrough, of a case-hardened metallic arm in rigid connection with the column extending laterally therefrom below the steering wheel, a shackle supported by said lock arm, a lock for coöperating with said shackle to lock the steering wheel in connection with said lock arm, and a latch device for supporting the shackle in connection with said lock arm.

6. In an automobile, the combination with steering mechanism comprising a column and a steering wheel detachably supported above the column, and a device for holding the steering wheel in position, of a lock arm attached to the steering column, a lock element coöperating with said arm, and a member in connection with the steering wheel locking said device from detachment and thereby preventing removal of the steering wheel, said member being engageable by said lock element to prevent removal of said member and to lock the steering wheel in connection with said lock arm.

7. In an automobile, the combination with steering mechanism comprising a column and a steering wheel supported above the column, of a lock arm, a lock member carried by the lock arm, a latch device supported by the lock arm for holding the lock member in connection therewith, and another lock member carried by the steering wheel engageable with the first-named lock member to lock the steering wheel from rotation.

8. In an automobile, the combination with steering mechanism comprising a column, and a steering wheel mounted at the top of the column, of a lock arm attached to the column, elements preventing movement of the lock arm on the column, a lock member supported by the lock arm, a latch device for holding the lock member in connection with the lock arm when said member is in unlocking position, said lock arm having a notch in which said latch device engages when said member is in unlocking position whereby said member is prevented from movement into contact with the steering wheel, and another lock member supported by the steering wheel adapted to be engaged by the first-named lock member to lock the steering wheel in connection with said lock arm.

9. In an automobile, the combination with steering mechanism comprising a column and a steering wheel above the column, of a lock arm attached to the column, a lock shackle supported by the lock arm, a latch for latching the shackle in unlocked position in connection with the lock arm, and another lock member carried by the steering wheel engageable by the first-named lock member to lock the steering wheel in connection with said lock arm.

10. In an automobile, the combination with steering mechanism comprising a column and a steering wheel at the top of the column, of a lock arm attached to the column, a lock shackle supported by the lock arm, a latch device for latching the lock shackle in unlocked position, a spring actuating said latch device into contact with the shackle, means for releasing said latch device to permit said shackle to be moved to locking position, and a lock supported by the wheel arranged to be engaged by said shackle to lock the steering wheel in connection with said lock arm.

11. In an automobile, the combination with steering mechanism comprising a column, and a steering wheel at the top of the column provided with spokes, of a lock device arranged to engage one of the spokes of the steering wheel and lock the steering wheel in connection with the column to prevent turning of the steering wheel in either direction, and an element separate from the steering wheel locked in connection with the spoke of the steering wheel by said lock device to prevent severance of the spoke between the lock device and the axis of the wheel.

12. In an automobile, the combination with the steering mechanism comprising a column, a steering rod, a steering wheel in connection with said rod at the top of the column having a spoke, and a device holding the steering wheel in connection with the steering rod, of an arm in rigid connection with the column extending laterally therefrom in such position that said spoke will be directly above said arm when the steering wheel is in a predetermined position, an element in connection with the said spoke locking said device and thereby the steering wheel on the steering rod, and a lock device arranged to lock said spoke to said arm and lock said element on said spoke.

13. In an automobile, the combination with steering mechanism comprising a column, a steering rod in the column, a steering wheel in connection with said rod at the top of the column and a device holding the steering wheel in connection with the rod, of an arm supported by the column, a shackle arranged to engage with said arm, an element engaged by the shackle to lock said device in position to prevent removal of the steering wheel, and a lock for holding the shackle in locking position to prevent removal of said element and turning of the steering wheel.

14. In an automobile, the combination with steering mechanism comprising a column, a steering rod in the column, a steering wheel in connection with the steering rod at the top of the column and provided with a spoke, and a nut holding the steering wheel in position, of a lock arm supported by the column and extending radially therefrom below the steering wheel in such position that said spoke is directly above said arm when the steering wheel is in a position which it occupies when the front wheels of the automobile are stationary, a device secured to the spoke and engaging said nut and preventing removal of said nut or said wheel from the steering rod, a shackle arranged to lock said device on the spoke and said spoke to said arm, and a lock holding the shackle in locking position.

15. In an automobile, the combination with steering mechanism comprising a column, a steering rod in the column, a steering wheel in connection with said rod at the top of the column and provided with spokes, and a device holding the steering wheel in connection with the rod, of a lock arm carried by the column below the steering wheel, said lock arm being arranged relative to the spokes of the steering wheel so that a predetermined one of said spokes will be in vertical alinement with the lock arm when the steering wheel is in the position which it occupies when the front wheels of the automobile are deflected obliquely toward one side, an element for preventing removal of said device, and means for locking said element in position to prevent removal of said device and for locking said spoke in connection with said lock arm.

16. In an automobile, the combination with steering mechanism comprisng a column, a steering rod, a steering wheel on the steering rod, a device holding the steering wheel on the rod, an element for preventing removal of said device, means holding said element premanently in connection with the steering wheel, and a rigid arm of a lock device for locking said element in connection with the steering wheel and with said device and for locking said steering wheel in connection with the rigid arm.

17. In an automobile, the combination with steering mechanism comprising a column, a steering rod in the column, a steering wheel on the steering rod having spokes and having a hole through one of said spokes, of a lock arm rigidly supported in connection with the steering column, a lock having a shackle arranged to pass through said hole in said spoke and engage said lock arm and thereby lock the steering wheel in connection with the lock arm, and means held in position by said lock to protect the spoke between the hole therethrough and the hub of the steering wheel.

18. In an automobile, the combination with steering mechanism comprising a column, a steering wheel above the column having a spoke, of a plate secured to the upper side of said spoke parallel therewith and having a relatively deep and long groove in the upper side and in the direction of the length thereof, there being holes through said spoke and said plate from the ends of said groove, a lock arm supported by the column extending laterally therefrom below the plane in which said spoke operates, a lock shackle arranged to seat within said groove and to pass through said holes and engage with said lock arm, and a removable lock for engaging the shackle below the lock arm to hold the shackle in the position aforesaid.

RAPHAEL L. SMITH.